(12) United States Patent
Jung

(10) Patent No.: US 7,265,805 B2
(45) Date of Patent: Sep. 4, 2007

(54) METHOD FOR CUTTING LIQUID CRYSTAL DISPLAY PANEL WHEREIN REMOVING A PARTICULAR PORTION OF THE SEAL LINE

(75) Inventor: Sung Su Jung, Daegu (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 260 days.

(21) Appl. No.: 10/879,361

(22) Filed: Jun. 30, 2004

(65) Prior Publication Data

US 2005/0118921 A1    Jun. 2, 2005

(30) Foreign Application Priority Data

Nov. 29, 2003   (KR) .................. 10-2003-0086032

(51) Int. Cl.
   *G02F 1/1339*   (2006.01)
   *G02F 1/13*     (2006.01)

(52) U.S. Cl. .............. 349/153; 349/190; 349/187

(58) Field of Classification Search ........... 349/153, 349/190, 158, 187; 438/33, 113; 83/885; 225/96.5
   See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |

(Continued)

FOREIGN PATENT DOCUMENTS

EP    1 003 066    5/2000

(Continued)

*Primary Examiner*—Mike Qi
(74) *Attorney, Agent, or Firm*—McKenna Long & Aldridge LLP.

(57) ABSTRACT

A method for cutting a liquid crystal display panel includes providing first and second mother substrates, forming a scribing line on the first and second mother substrates, removing a portion of a seal line being overlapped with the scribing line, the seal line formed on one of the first and second mother substrates, and dividing the first and second mother substrates into a plurality of unit liquid crystal display panels along the scribing line.

15 Claims, 6 Drawing Sheets

U.S. PATENT DOCUMENTS

| | | | |
|---|---|---|---|
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,204,906 B1 * | 3/2001 | Tannas, Jr. | 349/153 |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,297,869 B1 * | 10/2001 | Choo et al. | 349/187 |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,542,215 B2 * | 4/2003 | Lee et al. | 349/153 |
| 6,795,154 B2 * | 9/2004 | Uh et al. | 349/158 |
| 2001/0021000 A1 | 9/2001 | Egami | |

FOREIGN PATENT DOCUMENTS

| | | |
|---|---|---|
| EP | 1 003 066 A1 | 5/2000 |
| JP | 51-65656 | 6/1976 |
| JP | 57-038414 | 3/1982 |
| JP | 57-38414 | 3/1982 |
| JP | 57-88428 | 6/1982 |
| JP | 57-088428 | 6/1982 |
| JP | 58-27126 | 2/1983 |
| JP | 58-027126 | 2/1983 |
| JP | 59-57221 | 4/1984 |
| JP | 59-057221 | 11/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-007822 | 1/1986 |
| JP | 61-55625 | 3/1986 |
| JP | 61-055625 | 3/1986 |
| JP | S62-054225 | 3/1987 |
| JP | S62-054228 | 3/1987 |
| JP | 62-89025 | 4/1987 |
| JP | 62-089025 | 4/1987 |
| JP | 62-090622 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 05-127179 | 5/1993 |
| JP | 5-154923 | 6/1993 |
| JP | 05-154923 | 6/1993 |
| JP | 05-265011 | 10/1993 |
| JP | 5-265011 | 10/1993 |
| JP | 05-281557 | 10/1993 |
| JP | 5-281557 | 10/1993 |
| JP | 5-281562 | 10/1993 |
| JP | 05-281562 | 10/1993 |
| JP | H06-018829 | 1/1994 |
| JP | 06-051256 | 2/1994 |
| JP | 6-51256 | 2/1994 |
| JP | H06-064229 | 3/1994 |
| JP | 06-148657 | 5/1994 |
| JP | 6-148657 | 5/1994 |
| JP | 06-160871 | 6/1994 |
| JP | 6-160871 | 6/1994 |
| JP | H06-194637 | 7/1994 |
| JP | 06-235925 | 8/1994 |
| JP | 6-235925 | 8/1994 |
| JP | 6-265915 | 9/1994 |
| JP | 06-265915 | 9/1994 |
| JP | 6-313870 | 11/1994 |
| JP | 06-313870 | 11/1994 |
| JP | 07-084268 | 3/1995 |
| JP | 7-84268 | 3/1995 |
| JP | 7-128674 | 5/1995 |
| JP | 07-128674 | 5/1995 |
| JP | 07-181507 | 7/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 08-095066 | 4/1996 |
| JP | 08-101395 | 4/1996 |
| JP | 8-101395 | 4/1996 |
| JP | 08-106101 | 4/1996 |
| JP | 8-106101 | 4/1996 |
| JP | H08-110504 | 4/1996 |
| JP | H08-136937 | 5/1996 |
| JP | 08-171094 | 7/1996 |
| JP | 8-171094 | 7/1996 |
| JP | 08-190099 | 7/1996 |
| JP | 8-190099 | 7/1996 |
| JP | H08-173874 | 7/1996 |
| JP | 8-240807 | 9/1996 |
| JP | 08-240807 | 9/1996 |
| JP | 09-005762 | 1/1997 |
| JP | 9-5762 | 1/1997 |
| JP | 9-26578 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 9-61829 | 3/1997 |
| JP | 9-73075 | 3/1997 |
| JP | 09-073075 | 3/1997 |
| JP | 9-73096 | 3/1997 |
| JP | 09-073096 | 3/1997 |
| JP | H09-094500 | 4/1997 |
| JP | 9-127528 | 5/1997 |
| JP | 09-127528 | 5/1997 |
| JP | 09-230357 | 9/1997 |
| JP | 9-230357 | 9/1997 |
| JP | 09-281511 | 10/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-14953 | 1/1999 |
| JP | 11-38424 | 2/1999 |
| JP | 11-038424 | 2/1999 |
| JP | 11-64811 | 3/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |

| | | | | | | |
|---|---|---|---|---|---|---|
| JP | H11-262712 | 9/1999 | | JP | 2001-272640 | 10/2001 |
| JP | H11-264991 | 9/1999 | | JP | 2001-281675 | 10/2001 |
| JP | 11-326922 | 11/1999 | | JP | 2001-281678 | 10/2001 |
| JP | 11-344714 | 12/1999 | | JP | 2001-282126 | 10/2001 |
| JP | 2000-002879 | 1/2000 | | JP | 2001-305563 | 10/2001 |
| JP | 2000-2879 | 1/2000 | | JP | 2001-330837 | 11/2001 |
| JP | 2000-029035 | 1/2000 | | JP | 2001-330840 | 11/2001 |
| JP | 2000-29035 | 1/2000 | | JP | 2001-356353 | 12/2001 |
| JP | 2000-056311 | 2/2000 | | JP | 2001-356354 | 12/2001 |
| JP | 2000-56311 | 2/2000 | | JP | 2002-14360 | 1/2002 |
| JP | 2000-66165 | 3/2000 | | JP | 2002-014360 | 1/2002 |
| JP | 2000-066165 | 3/2000 | | JP | 2002-23176 | 1/2002 |
| JP | 2000-066218 | 3/2000 | | JP | 2002-023176 | 1/2002 |
| JP | 2000-093866 | 4/2000 | | JP | 2002-049045 | 2/2002 |
| JP | 2000-137235 | 5/2000 | | JP | 2002-49045 | 2/2002 |
| JP | 2000-147528 | 5/2000 | | JP | 2002-079160 | 3/2002 |
| JP | 2000-193988 | 7/2000 | | JP | 2002-080321 | 3/2002 |
| JP | 2000-241824 | 9/2000 | | JP | 2002-082340 | 3/2002 |
| JP | 2000-284295 | 10/2000 | | JP | 2002-82340 | 3/2002 |
| JP | 2000-292799 | 10/2000 | | JP | 2002-090759 | 3/2002 |
| JP | 2000-2927999 | 10/2000 | | JP | 2002-90759 | 3/2002 |
| JP | 2000-310759 | 11/2000 | | JP | 2002-90760 | 3/2002 |
| JP | 2000-310784 | 11/2000 | | JP | 2002-090760 | 3/2002 |
| JP | 2000-338501 | 12/2000 | | JP | 2002-107740 | 4/2002 |
| JP | 2001-5401 | 1/2001 | | JP | 2002-122870 | 4/2002 |
| JP | 2001-005401 | 1/2001 | | JP | 2002-122872 | 4/2002 |
| JP | 2001-005405 | 1/2001 | | JP | 2002-122873 | 4/2002 |
| JP | 2001-5405 | 1/2001 | | JP | 2002-131762 | 5/2002 |
| JP | 2001-013506 | 1/2001 | | JP | 2002-139734 | 5/2002 |
| JP | 2001-13506 | 1/2001 | | JP | 2002-156518 | 5/2002 |
| JP | 2001-033793 | 2/2001 | | JP | 2002-169166 | 6/2002 |
| JP | 2001-33793 | 2/2001 | | JP | 2002-169167 | 6/2002 |
| JP | 2001-42341 | 2/2001 | | JP | 2002-182222 | 6/2002 |
| JP | 2001-042341 | 2/2001 | | JP | 2002-202512 | 7/2002 |
| JP | 2001-051284 | 2/2001 | | JP | 2002-202514 | 7/2002 |
| JP | 2001-51284 | 2/2001 | | JP | 2002-214626 | 7/2002 |
| JP | 2001-066615 | 3/2001 | | JP | 2002-229042 | 8/2002 |
| JP | 2001-66615 | 3/2001 | | JP | 2002-236276 | 8/2002 |
| JP | 2001-091727 | 4/2001 | | JP | 2002-258299 | 8/2002 |
| JP | 2001-91727 | 4/2001 | | JP | 2002-236292 | 9/2002 |
| JP | 2001-117105 | 4/2001 | | JP | 2002-277865 | 9/2002 |
| JP | 2001-117109 | 4/2001 | | JP | 2002-277866 | 9/2002 |
| JP | 2001-133745 | 5/2001 | | JP | 2002-277881 | 9/2002 |
| JP | 2001-133794 | 5/2001 | | JP | 2002-287156 | 10/2002 |
| JP | 2001-133799 | 5/2001 | | JP | 2002-296605 | 10/2002 |
| JP | 2001-142074 | 5/2001 | | JP | 2002-311438 | 10/2002 |
| JP | 2001-147437 | 5/2001 | | JP | 2002-311440 | 10/2002 |
| JP | 2001-154211 | 6/2001 | | JP | 2002-311442 | 10/2002 |
| JP | 2001-166272 | 6/2001 | | JP | 2002-323687 | 11/2002 |
| JP | 2001-166310 | 6/2001 | | JP | 2002-323694 | 11/2002 |
| JP | 2001-183675 | 7/2001 | | JP | 2002-333628 | 11/2002 |
| JP | 2001-183683 | 7/2001 | | JP | 2002-333635 | 11/2002 |
| JP | 2001-201750 | 7/2001 | | JP | 2002-333843 | 11/2002 |
| JP | 2001-209052 | 8/2001 | | JP | 2002-341329 | 11/2002 |
| JP | 2001-209056 | 8/2001 | | JP | 2002-341355 | 11/2002 |
| JP | 2001-209057 | 8/2001 | | JP | 2002-341356 | 11/2002 |
| JP | 2001-209058 | 8/2001 | | JP | 2002-341357 | 11/2002 |
| JP | 2001-209060 | 8/2001 | | JP | 2002-341358 | 11/2002 |
| JP | 2001-215459 | 8/2001 | | JP | 2002-341359 | 11/2002 |
| JP | 2001-222017 | 8/2001 | | JP | 2002-341362 | 11/2002 |
| JP | 2001-235758 | 8/2001 | | KR | 2000-0035302 | 6/2000 |
| JP | 2001-255542 | 9/2001 | | | | |
| JP | 2001-264782 | 9/2001 | | | | |

\* cited by examiner

METHOD FOR CUTTING LIQUID CRYSTAL DISPLAY PANEL WHEREIN REMOVING A PARTICULAR PORTION OF THE SEAL LINE

The present application claims the benefit of Korean Patent Application No. 10-2003-86032 filed in Korea on Nov. 29, 2003, which is hereby incorporated by reference.

BACKGROUND OF THE INVENTION

1. Field of the Invention

The present invention relates to a method for cutting a substrate, and more particularly, to a method for cutting a liquid crystal display panel fabricated on a large-sized mother substrate into individual liquid crystal display panel units that avoid panel degradation caused by a seal pattern.

2. Discussion of the Related Art

Image display devices have become increasingly important in the current Information Age and demands for image display devices that have high resolution images, lightness, thin profile, compact size, and low voltage power consumption are growing. Presently, a liquid crystal display (LCD), which is a major product of a flat panel display (FPD), that meets such demands is available for mass production as a substitute for cathode-ray tubes (CRTs) or television monitors.

In general, a liquid crystal display device receives data signals corresponding to picture information that are individually supplied to liquid crystal cells arranged in a matrix form in the display device. Light transmittance of the liquid crystal cells is controlled based on the data signals to display a desired picture.

The liquid crystal display apparatus generally is fabricated by forming thin film transistor array substrates on a large-sized mother substrate, forming color filter substrates on a separate mother substrate and bonding the two mother substrates to each other, thereby simultaneously fabricating multiple individual liquid crystal display panel units and thereby improving a fabrication yield. Such a fabrication requires a process for cutting the large-sized mother substrates to form individual liquid crystal display panel units.

The cutting process for the liquid crystal display panels is generally carried out by forming a prearranged cut line on the surface of the mother substrate using a wheel and applying a force on the mother substrate to form a crack (split) along the prearranged cut line, thereby cutting the mother substrate into multiple liquid crystal display panel units.

FIG. 1 is a plan view showing the structure of a liquid crystal display panel according to the related art. In FIG. 1, a unit liquid crystal display panel 10 includes an array substrate 20, a color filter substrate 30, and a liquid crystal layer (not shown) formed between the array substrate 20 and the color filter substrate 30. The array substrate 20 includes a plurality of gate lines 21 and a plurality of data lines 22 vertically and horizontally arranged thereon and defining a plurality of pixel regions. A thin film transistor (TFT) (not shown) and a pixel electrode are formed in each of the pixel regions.

The array substrate 20 has one longer side and one shorter side protruded as compared to the color filter substrate 30, where a driving circuit unit for driving the liquid crystal display panel is positioned. A gate pad region 24 is formed at the protruded shorter side of the array substrate 20 and a data pad region 23 is formed at the protruded longer side of the array substrate 20. The gate pad region 24 supplies scan signals input from a gate driving circuit unit (not shown) to the gate lines 21 and the data pad region 23 supplies image information input from a data driving circuit unit (not shown) to the data lines 22, thereby selectively driving the pixel regions to display an image in an image display region 25.

The color filter substrate 30 includes a color filter (not shown) and a common electrode (not shown), a counter electrode of the pixel electrode formed at the array substrate 20.

A cell gap is provided between the array substrate 20 and the color filter substrate 30 by a spacer (not shown). The array substrate 20 and the color filter substrate 30 are attached by a seal pattern 40 formed at an outer edge of the image display region 25. The array substrate 20 and the color filter substrate 30 are attached by an attachment key (not shown) formed on one of the array substrate 20 and the color filter substrate 30.

In general, to improve a fabrication yield, a plurality of unit liquid crystal display panels are simultaneously formed on a large scale mother substrate. The method requires a process for separating the unit liquid crystal display panels from the large size mother substrate by cutting the mother substrate.

FIG. 2 is a cross-sectional view of mother substrates according to the related art. In FIG. 2, a plurality of color filter substrates 130 are formed on a first mother substrate 100A, and a plurality of array substrates 120 are formed on a second mother substrate 100B. In addition, each of the array substrates 120 has a protruding region respective to a corresponding one of the color filter substrates 130, such that a gate pad region and a data pad region are formed in the protruding region. Thus, a first dummy region 150A is formed on the first mother substrate 100A between the color filter substrates 130 corresponding to the protruding regions of the array substrates 120.

Each unit liquid crystal display panel is arranged to utilize the first and second mother substrates 100A and 100B to the maximum, and in general unit liquid crystal display panels are formed to be separated by a second dummy region 150B. Third dummy regions 150C are formed at edges of the first and second mother substrates 100A and 100B to provide a process margin.

After the second mother substrate 100B defining the plurality of array substrates 120 and the first mother substrate 100A defining the plurality of color filter substrates 130 are attached, they are cut to form a plurality of unit liquid crystal display panels through scribing and breaking processes, i.e., a cutting process. In the cutting process, the first dummy region 150A, the second dummy region 150B, and the third dummy region 150C are simultaneously removed. Before the unit liquid crystal display panels are cut, a scribing process forms a prearranged cut line on the mother substrates 100A and 100B. The prearranged cut line is formed using a pen made of diamond having a higher hardness than glass. Then, the breaking process includes applying a mechanical force along the prearranged cut line to cut the mother substrates 100A and 100B into the unit liquid crystal display panels.

FIG. 3 illustrates a scribing process according to the related art. As shown in FIG. 3, a cutting wheel 160 needs to cut through a seal pattern 140 between the first and second mother substrates 100A and 100B. However, the cutting process is not smoothly performed at the seal pattern 140. Because a scribe line is formed only on the first mother substrate 100A, when a breaking process is performed, vertical or horizontal cracks are undesirably generated at a portion where the seal line is overlapped with the scribing line. As a result, the substrates cannot be properly cut or the cut sectional side becomes rough. When this happens, the substrate should be discarded, thereby reducing a fabrication yield.

SUMMARY OF THE INVENTION

Accordingly, the present invention is directed to a method that substantially obviates one or more of the problems due to limitations and disadvantages of the related art.

An object of the present invention is to provide a method for cutting a liquid crystal display panel that before forming a scribe line, removes a portion of a seal line that would overlap a scribe line if not removed, thereby ensuring smooth breakage between unit liquid crystal display panels and increasing a fabrication yield.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the method for cutting a liquid crystal display panel includes providing first and second mother substrates, forming a scribing line on the first and second mother substrates, removing a portion of a seal line being overlapped with the scribing line, the seal line formed on one of the first and second mother substrates, and dividing the first and second mother substrates into a plurality of unit liquid crystal display panels along the scribing line.

In another aspect, the method for cutting a liquid crystal display panel includes attaching first and second mother substrates to each other, forming a first prearranged cut line on the first and second mother substrates, a portion of a seal line between the first and the second mother substrates being overlapped with the first prearranged cut line is removed, and forming a second prearranged cut line on the first and second mother substrates after the portion of the seal line overlapped with the second prearranged cut line is removed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
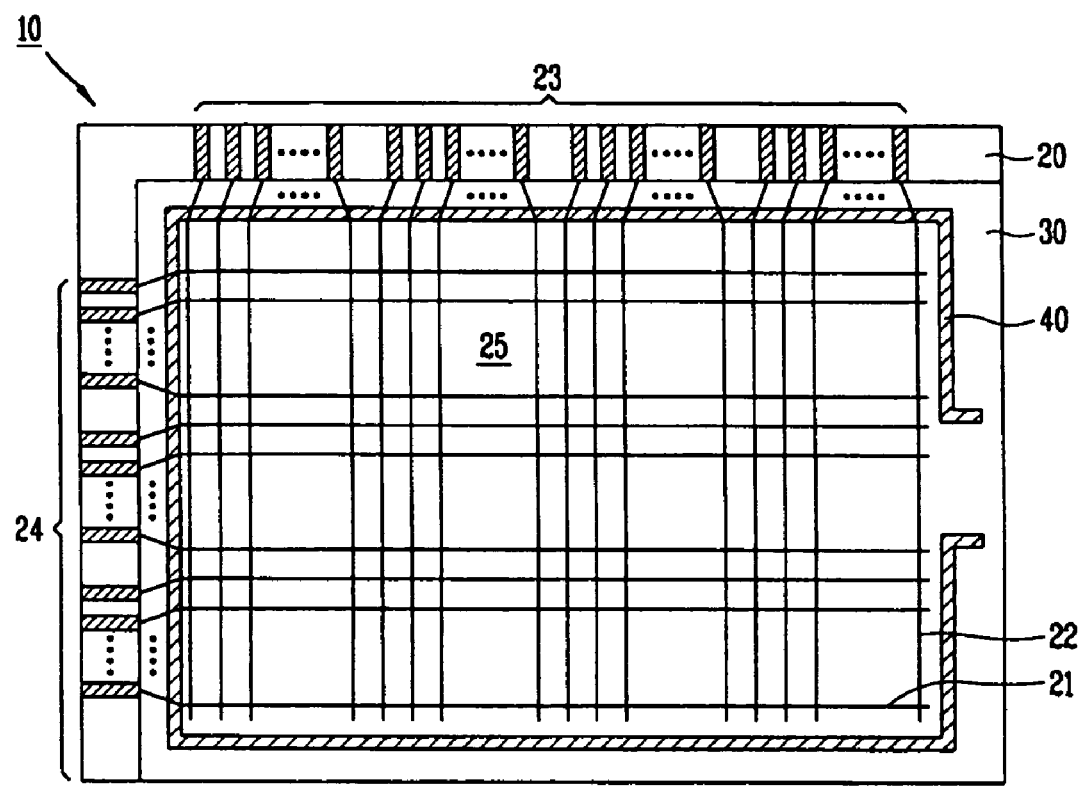
FIG. 1 is a plan view showing the structure of a liquid crystal display panel according to the related art.
Figure 2:
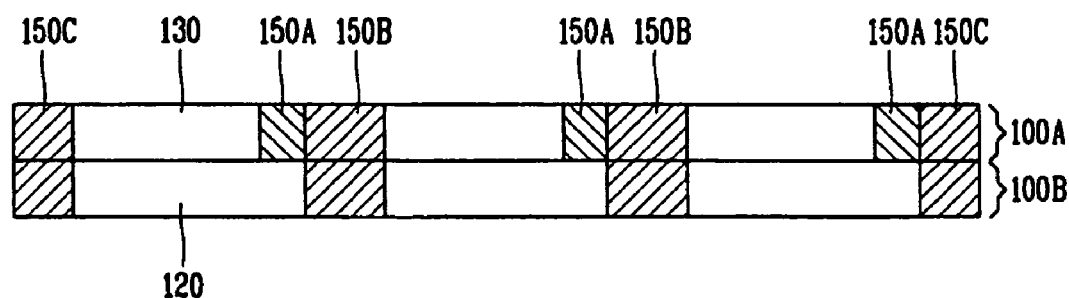
FIG. 2 is a cross-sectional view of mother substrates according to the related art.
Figure 3:
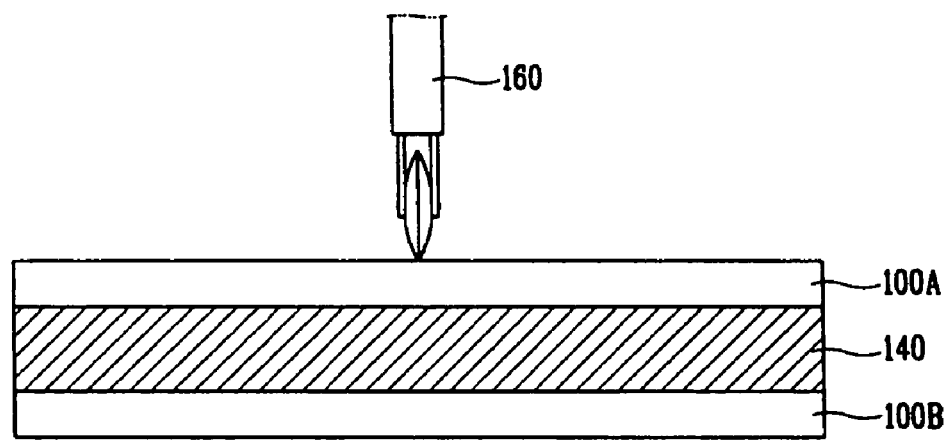
FIG. 3 illustrates a scribing process according to the related art.
Figure 4:
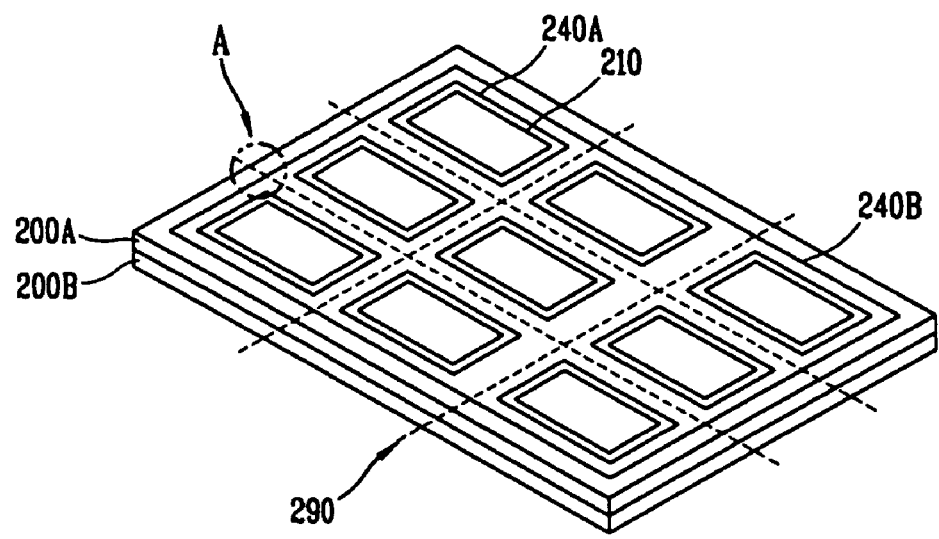
FIG. 4 is a perspective view of mother substrates according to an embodiment of the present invention.

FIG. 4 is a perspective view of mother substrates according to an embodiment of the present invention. In FIG. 4, a first mother substrate 200A and a second mother substrate 200B may be attached to each other by first and second seal patterns 240A and 240B. The first mother substrate 200A may include a plurality of unit color filter substrates and the second mother substrate 200B may include a plurality of unit array substrates. In addition, a liquid crystal layer (not shown) may be formed between the first and second mother substrates 200A and 200B. Accordingly, the first and second mother substrates 200A and 200B may be cut and broken along scribe lines 290 to form a plurality of unit liquid crystal display panels 210.

The liquid crystal layer (not shown) may be formed by a liquid injection method and a liquid dropping method. When a liquid injection method is employed, the seal pattern 240A may include a liquid crystal injection opening (not shown). When the liquid dropping method is employed, the first seal pattern 240A may be in a closed shape along an outer edge of each of the unit liquid crystal display panels 210. As the size of the mother substrates increases, the liquid dropping method may be preferably employed because the liquid crystal layer may be formed in a shorter period of time using the liquid dropping method.

The first seal pattern 240A may be formed along the outer edge of each of the unit liquid crystal display panels 210 to maintain a predetermined cell gap therein. In addition, the first seal pattern 240A and the liquid crystal layer may be formed at the same substrate or at different substrates. For instance, the liquid crystal layer may be dropped on the array substrate and the first seal pattern 240A may be formed at the color filter substrate, or vice versa.

The second seal pattern 240B may be formed at a periphery region of at least one of the first and second mother substrates 200A and 200B to maintain vacuum pressure in vacuum attachment, and to protect the seal pattern 240A.

The seal patterns 240A and 240B may be formed using an ultraviolet hardening sealant, a thermosetting sealant or a mixture of the ultraviolet hardening sealant and the thermosetting sealant.

The scribing lines 290 may be formed using a cutting wheel (not shown) on one of the first and second mother substrates 200A and 200B. In addition, two cutting wheels may be employed to cut two parallel scribes lines 290 at the same time, thereby reducing fabrication time. However, at the portion 'A', the scribe lines 290 overlaps the second seal pattern 240B. Since the seal pattern 240B is hardened before the cutting process, it is difficult to form the scribing line 290 through the seal pattern 240B. Accordingly, the method of cutting according to an embodiment of the present invention includes using a laser to remove a portion of the seal pattern overlapping a scribe line.

Figure 5A:
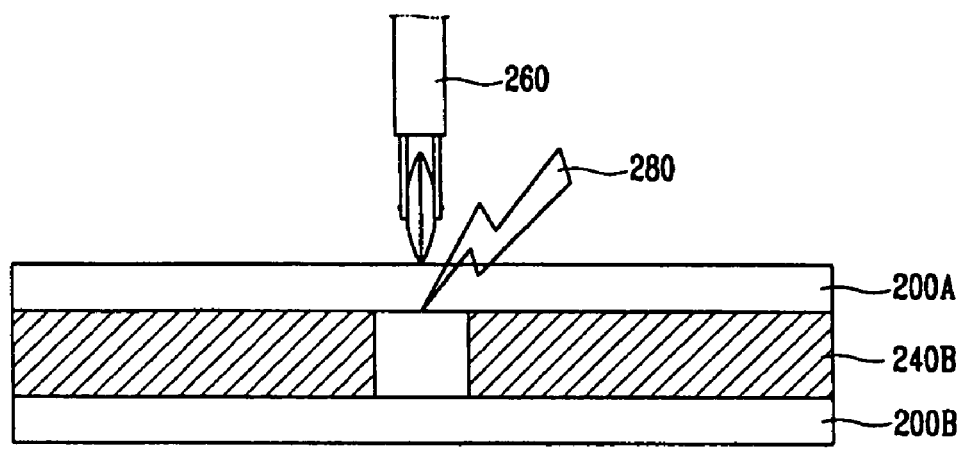
FIG. 5A is a cross-sectional view of the portion 'A' in FIG. 4 according to an embodiment of the present invention.
Figure 5B:
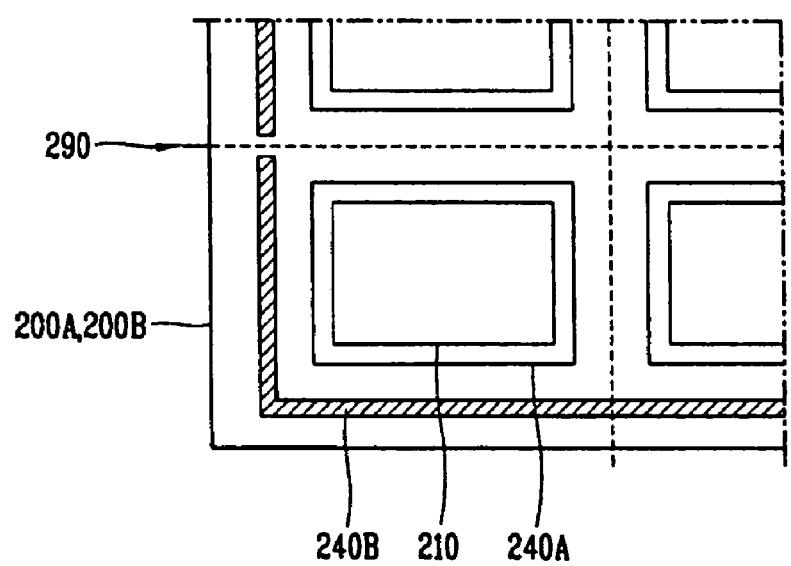
FIG. 5B is a plan view of the portion 'A' in FIG. 5A.

FIG. 5A is a cross-sectional view of the portion 'A' in FIG. 4 according to an embodiment of the present invention, and FIG. 5B is a plan view of the portion 'A' in FIG. 5A. As shown in FIG. 5A, a cutting wheel 260 may cut the attached first and second mother substrates 200A and 200B. In addition, the cutting wheel 260 may include a laser generating unit (not shown) at its front side. Thus, the cutting wheel 260 may remove a portion of the second seal pattern 240B using a laser beam 280 and may then cut the attached first and second mother substrates 200A and 200B along a region in which the second seal pattern 240B is removed.

As shown in FIG. 5B, a portion of the second seal pattern 240B that overlaps the scribe lines 290 at the portion 'A' (shown in FIG. 4) may be removed by the laser beam 280 (shown in FIG. 5A). Accordingly, the cutting wheel 260 may smoothly proceed, regardless of formation of the first and second seal patterns 240A and 240B, while the remaining portion of the second seal pattern 240B serves as a proceeding guide. Thus, a desired scribing line 290 may be formed to facilitate cutting of the mother substrates 200A and 200B.

Figure 6A:
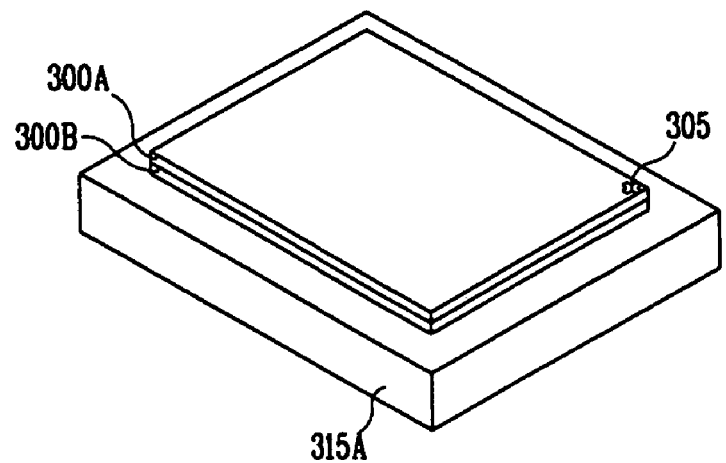
FIGS. 6A to 6F are views showing a process of cutting the liquid crystal display panel according to an embodiment of the present invention.

FIGS. 6A to 6F are views showing a process of cutting the liquid crystal display panel according to an embodiment of the present invention. In FIG. 6A, first and second mother substrates 300A and 300B may be aligned based on an alignment mark 305 and may be attached to each other. In addition, the first and second mother substrates 300A and 300B may be placed on a first table 315A.

In addition, the first and second mother substrates 300A and 300B may include a plurality of unit array substrates and unit color filter substrates formed thereon, respectively. Since the first and second mother substrates 300A and 300B are stacked with the array substrates on the color filter substrates, an impact applied to the array substrate or to the color filter substrate during a cutting process may be mitigated compared to stacking the mother substrates in the opposite manner.

Figure 6B:
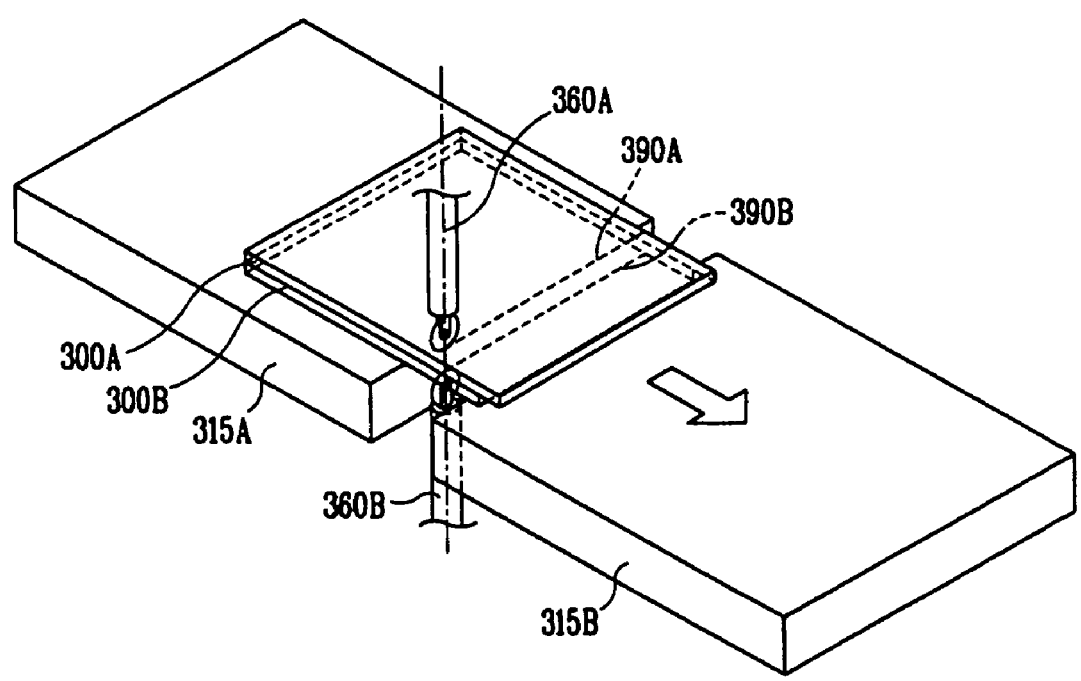

As shown in FIG. 6B, the first and second mother substrates 300A and 300B may be moved by a predetermined distance along the arrow ⇒, such that the mother substrates 300A and 300B may be positioned between the first table 315A and a second table 315B. The second table 315B may be separated from the first table 315A and a middle portion of the mother substrates 300A and 300B may be suspended between the first and second tables 315A and 315B. Then, first prearranged cut lines 390A and 390B may be sequentially or simultaneously formed at surfaces of the first and second mother substrates 300A and 300B using first and second cutting wheels 360A and 360B. Further, the first cutting wheel 360A may be placed above the tables 315A and 315B to form the first prearranged cut line 390A on an outer surface of the first mother substrate 300A, and the second cutting wheel 360B may be placed between the tables 315A and 315B to form the first prearranged cut line 390B on an outer surface of the second mother substrate 300B.

The array substrate formed on the first mother substrate 300A may include a protruding portion compared to a corresponding side of the color filter substrate formed on the second mother substrate 300B. A gate pad region and a data pad region may be formed on the protruding portion of the array substrate.

To form the first prearranged cut line 390A on the protruding portion of the array substrate, the first cutting wheel 360A may first be moved by a certain distance corresponding to the width of the protruded region from a reference line, may be lowered to contact an outer surface of the first mother substrate 300A, and may then be moved parallel along the reference line to form the first prearranged cut line 390A on the first mother substrate 300A. In addition, to form the first prearranged cut line 390B on the side of the color filter substrate corresponding to the protruding portion of the array substrate, the second cutting wheel 360B may be moved to the reference line, may be raised to contact an outer surface of the second mother substrate 300B, and may then be moved along the reference line to form the first prearranged cut line 390B on the second mother substrate 300B.

Further, at the side of the array substrate where the gate pad region and the data pad region are not formed (namely, the region that is not protruded compared to the color filter substrate), the first cutting wheel 360A and the second cutting wheel 360B may be aligned to correspond to each other, whereby the first prearranged cut lines 390A and 390B are formed at the outer surfaces of the first and second mother substrates 300A and 300B, respectively.

Moreover, where the first prearranged cut lines 390A and 390B cross a seal line (shown in FIG. 4), for example, the cutting wheels 360A and 360B pass the seal line formed at the front and rear end portions of the mother substrates 300A and 300B along the prearranged cut lines 390A and 390B, the seal line to be overlapped with the prearranged cut lines 390A and 390B maybe removed before the scribing process is performed. A laser generating unit (not shown) may be formed on one of the cutting wheels 360A and 360B and may provide a laser beam having energy to affect a sealant material but not to affect the mother substrates 300A and 300B. As a result, a portion of the seal line that would overlap the prearranged cut lines 390A and 390B if not removed is burnt off by the laser beam, so that the cutting wheels 360A and 360B may smoothly proceed regardless of formation of the seal pattern.

Figure 6C:
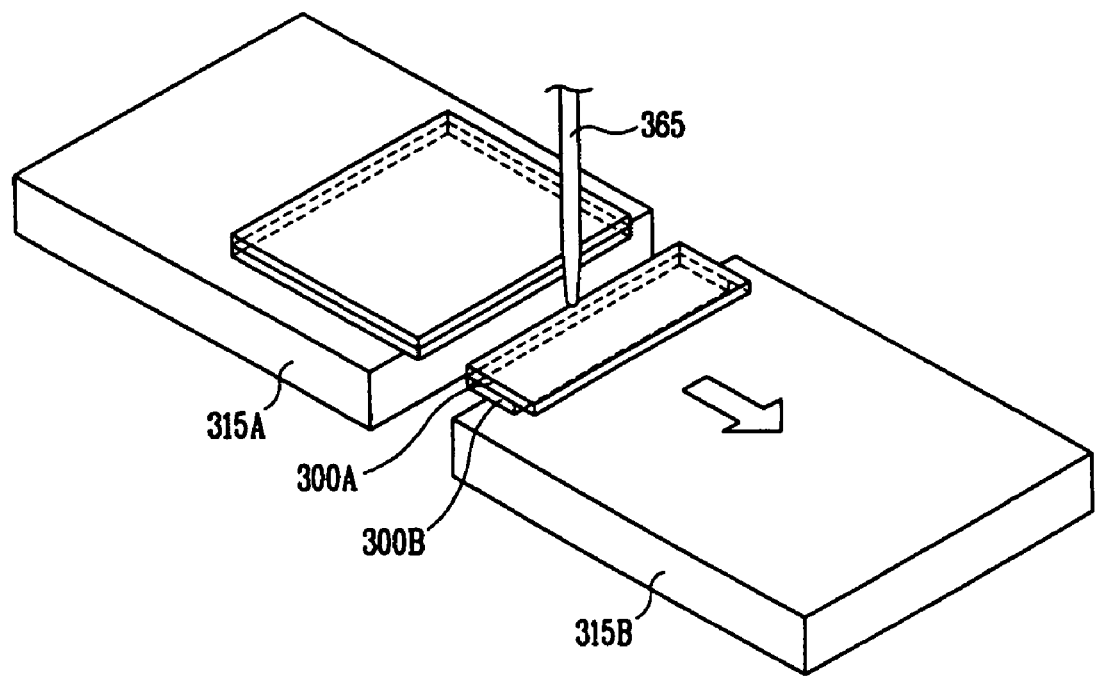

As shown in FIG. 6C, a roll 365 may apply pressure along the first prearranged cut lines 390A and 390B to sequentially cut the first and second mother substrates 300A and 300B. The roll 365 may form a crack along the first prearranged cut lines 390A and 390B on the first and second mother substrates 300A and 300B by simultaneously applying pressure to a portion or several portions along the first prearranged cut line 390A. In particular, the roll 365 and the first cutting wheel 360A may be moved by a same moving mechanism, such that the roll 365 would be positioned where the first prearranged cut line 390A is formed on the first mother substrate 300A and may apply pressure precisely along the first prearranged cut line 390A.

The roll 365 may apply pressure along one of the first prearranged cut line 390A and 390B formed at the surface of the first and second mother substrates 300A and 300B, or may apply pressure along both the first prearranged cut lines 390A and 390B. Since the roll 365 may apply a pressure by contacting with the first mother substrate 300A defining the array substrate, it is preferably formed of a urethane material so that it cannot slide on the glass substrate, has good electrostatic characteristics, and generates less particles.

Figure 6D:
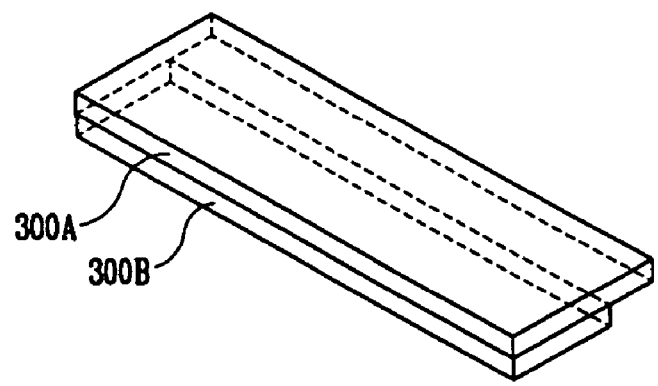
Figure 6E:
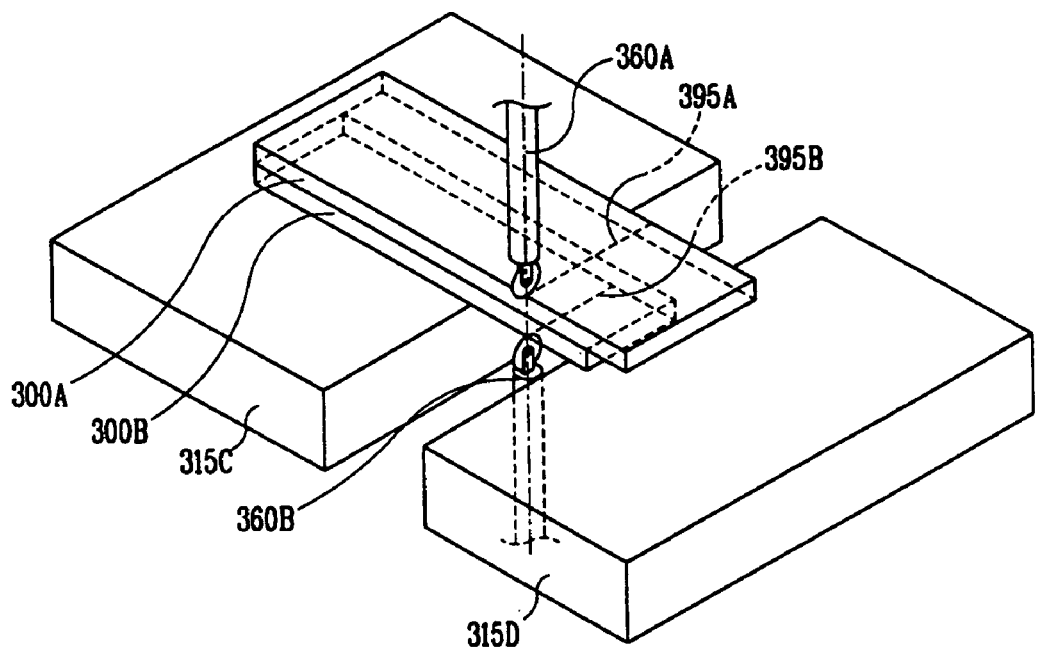

As shown in FIG. 6D, the first and second mother substrates 300A and 300B as-cut may be rotated by about 90°. As shown in FIG. 6E, the first and second mother substrates 300A and 300B may then be moved to be placed on third and fourth tables 315C and 315D. The third and fourth tables 315C and 315D may be separated from each other and a middle portion of the first and second mother substrates 300A and 300B may be suspended between the third and fourth tables 315C and 315D. The first and second tables 315A and 315B (shown in FIG. 6B) may be used as the third and fourth tables 315C and 315D.

In addition, second prearranged cut lines 395A and 395B may be sequentially formed at the outer surfaces of the first and second mother substrates 300A and 300B using the first and second cutting wheels 360A and 360B. Instead of using the first and second cutting wheels 360A and 360B, a third cutting wheel and a fourth cutting wheel may be used. Since the array substrate formed on the first mother substrate 300A may include a second protruding portion, to form the second prearranged cut line 395A on the protruding portion of the array substrate, the first cutting wheel 360A may first be moved by a certain distance corresponding to the width of the second protruded region from a reference line, may be lowered to contact the outer surface of the first mother substrate 300A, and may then be moved parallel along the reference line to form the second prearranged cut line 395A on the first mother substrate 300A.

In addition, to form the second prearranged cut line 395B on the side of the color filter substrate corresponding to the second protruding portion of the array substrate, the second cutting wheel 360B may be moved to the reference line, may be raised to contact the outer surface of the second mother substrate 300B, and may then be moved along the reference line to form the second prearranged cut line 395B on the second mother substrate 300B.

Further, at the side of the array substrate where the gate pad region and the data pad region are not formed (namely, the region that is not protruded compared to the color filter substrate), the first cutting wheel 360A and the second cutting wheel 360B may be aligned to correspond to each other, whereby the second prearranged cut lines 395A and 395B are formed at the outer surfaces of the first and second mother substrates 300A and 300B, respectively.

Moreover, where the second prearranged cut lines 395A and 395B cross a seal line (shown in FIG. 4), for example, the cutting wheels 360A and 360B pass the seal line formed at the front and rear end portions of the mother substrates 300A and 300B along the prearranged cut lines 395A and 395B, the seal line to be overlapped with the prearranged cut lines 395A and 350B maybe removed before the scribing process is performed using a laser beam.

Figure 6F:
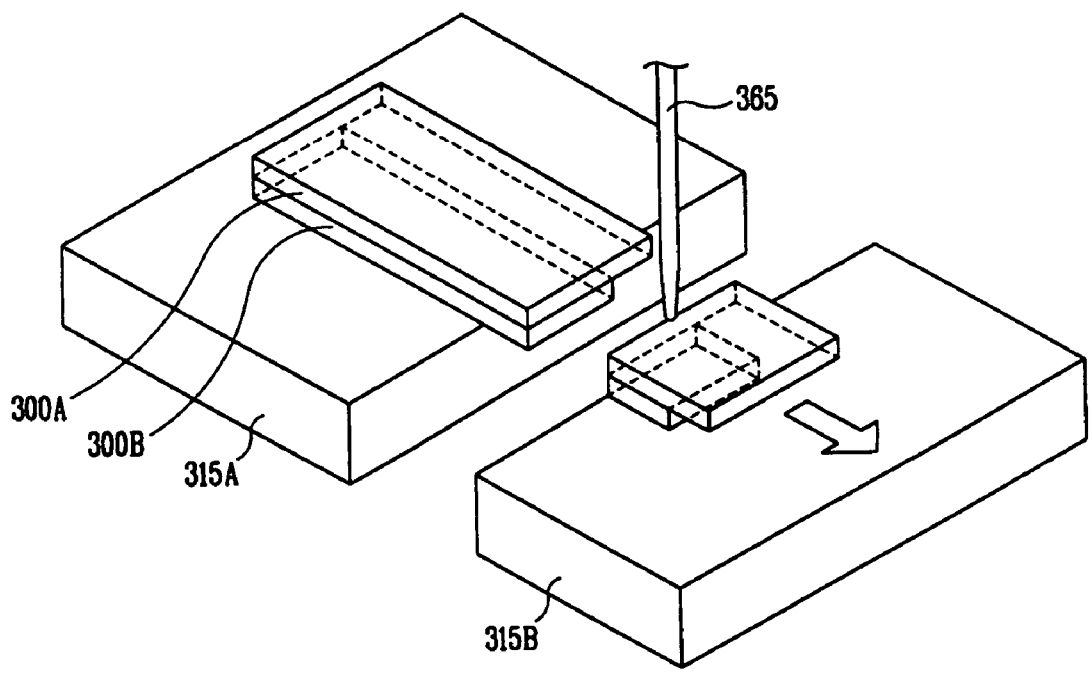

As shown in FIG. 6F, the roll 365 may apply pressure along the second prearranged cut lines 395A and 395B (show in FIG. 6E) to sequentially cut the first and second mother substrates 300A and 300B. The roll 365 may form a crack along the second prearranged cut lines 395A and 395B on the first and second mother substrates 300A and 300B by simultaneously applying pressure to a portion or several portions along one of the second prearranged cut lines 395A and 395B or along both of the second prearranged cut lines 395A and 395B. Accordingly, a unit liquid crystal display panel may be formed. The above-described cutting process may repeat to cut the first and second mother substrates 300A and 300B, to thereby form additional unit liquid crystal panels.

The above-described method for cutting a liquid crystal display panel according to an embodiment of the present invention has the advantage that by removing a portion of a seal line with laser prior to forming a scribe line, a desired scribe line may be formed, thereby reducing defective cutting. In addition, since the portion of the seal line overlapping with the scribe line is removed by laser and the remaining portion serves as a guide, the mother substrates may still be easily cut.

It will be apparent to those skilled in the art that various modifications and variations can be made in the method for cutting liquid crystal display panel according to the present invention without departing from the sprit or scope of the invention. Thus, it is intended that the present invention covers the modifications and variations of this invention provided they come within the scope of the appended claims and their equivalents.

What is claimed is:

1. A method for cutting a liquid crystal display panel, comprising:
    providing first and second mother substrates;
    forming a scribing line on the first and second mother substrates;
    removing a portion of a seal line being overlapped with the scribing line, the seal line formed on one of the first and second mother substrates; and
    dividing the first and second mother substrates into a plurality of unit liquid crystal display panels along the scribing line.

2. The method of claim 1, wherein removing the portion of the seal line includes using a laser to remove the portion of the seal line being overlapped with the scribing line.

3. The method of claim 1, wherein providing the first and second mother substrates comprises:
    forming a plurality of color filter substrates on the first mother substrate;
    forming a plurality of array substrates on the second mother substrate;
    forming the seal line with a sealant on one of the first and the second mother substrates; and
    attaching the first and second mother substrates by hardening the seal line.

4. The method of claim 1, wherein forming the scribing line includes using a cutting wheel.

5. The method of claim 4, wherein the cutting wheel includes a diamond.

6. The method of claim 4, wherein a laser is installed at the front of the cutting wheel.

7. The method of claim 1, wherein forming the scribing line includes using at least two cutting wheels.

8. The method of claim 7, wherein the cutting wheel includes a diamond.

9. The method of claim 7, wherein a laser is installed at the front of one of the cutting wheels.

10. A method for cutting a liquid crystal display panel, comprising:
    attaching first and second mother substrates to each other;
    forming a first prearranged cut line on the first and second mother substrates, a portion of a seal line between the first and the second mother substrates being overlapped with the first prearranged cut line is removed; and
    forming a second prearranged cut line on the first and second mother substrates, the portion of the seal line overlapped with the second prearranged cut line is removed.

11. The method of claim 10, further comprising:
    cutting the first and second mother substrates by applying a pressure to at least one portion of the first prearranged cut line through a roll to form a plurality of unit liquid crystal display panels.

12. The method of claim 10, further comprising:
    cutting the first and second mother substrates by applying a pressure to at least one portion of the second prearranged cut line through a roll to form a plurality of unit liquid crystal display panels.

13. The method of claim 10, wherein the portion of the seal line is removed using a laser.

14. The method of claim 10, wherein the first prearranged cut line and the second prearranged cut line are formed at substantially the same time using at least two cutting wheels.

15. The method of claim 10, wherein forming the first prearranged cut line includes forming the first prearranged cut line on an outer surface of the first mother substrate and forming the second prearranged cut line includes forming the second prearranged cut line on an outer surface of the second mother substrate.

* * * * *